SHURR & PALMER.
Churn.
No. 51,873. Patented Jan'y 2, 1866.
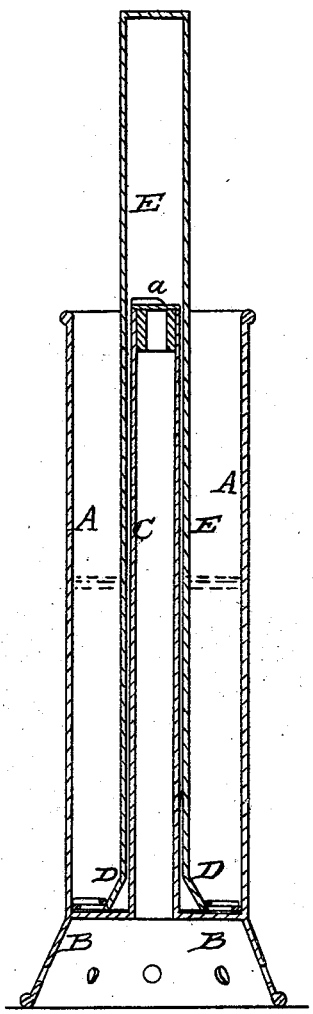

UNITED STATES PATENT OFFICE.

F. SHURR AND JOHN PALMER, OF MILWAUKEE, WISCONSIN.

IMPROVEMENT IN CHURNS.

Specification forming part of Letters Patent No. 51,873, dated January 2, 1866.

*To all whom it may concern:*

Be it known that we, FERDINAND SHURR and JOHN PALMER, of Milwaukee, in the county of Milwaukee and State of Wisconsin, have invented a new and useful Improvement in Churns; and we do hereby declare that the following is a full, clear, and exact description thereof, which will enable others skilled in the art to make and use the same, reference being had to the accompanying drawings, forming part of this specification, in which—

Figure 1 is a longitudinal vertical section of our invention. Fig. 2 is a top view of the dasher we employ.

Similar letters of reference indicate like parts.

The object of our invention is to introduce atmospheric air into a churn, so that the same shall be distributed through the cream, being introduced at the bottom thereof, and from whence it can rise through the same to the top of the churn, whereby we gain the full benefit thereof.

Our invention consists in the arrangement, within the body of a churn, of an air-tube which opens at the bottom of the churn, and has a suitable valve, and also in the employment, in connection with the same, of a dasher with a hollow stem, which works over the air-tube, serving as a piston to the air-pump, and which forces the air down to the bottom of the cream in the churn, where it is permitted to escape and be distributed throughout the cream, substantially as will be hereinafter described.

To enable others to understand our invention, we will proceed to describe it.

A represents the body of the churn, which may be of any desirable form. Around the bottom of the churn there is formed a rim or pedestal, B, perforated, or otherwise made so as to permit a free access thereto and circulation through it of air. Within this churn, near the center thereof, we secure a tube or air-duct, C, having its mouth at the bottom of the churn. This tube or air-duct is provided with a valve, a, opening upward, which, in the present instance, is placed at the top of the tube, as shown in Fig. 1; but it may be placed at the bottom, or elsewhere, if found desirable.

D is the dasher, which consists of a plate or disk having perforations through it for permitting it to work up and down in the cream in the ordinary way. (See Fig. 2.) To this dasher D there is secured a hollow stem or handle, E, which is closed at its top, and of a size sufficient to permit its receiving within it the air duct or tube C, and yet leaving space enough between the two to permit the air which has been drawn up to be forced down between the two to the bottom of the churn.

From the above description it will be seen that when the dasher is drawn up the valve *a* will open and permit the air to fill the space within the dasher-rod E, and that when the dasher is thrust downward the valve *a* will be closed and the air will be forced down and out at the bottom of the dasher-rod C, where it will be permitted to escape through the perforations in the dasher B into the cream contained in the churn, the motion of the dasher the meanwhile distributing it throughout the cream. The introduction of air into the cream greatly expedites the operation of "bringing butter," and it tends to cool the cream and to break up the granules or fatty lumps contained therein, and its effect upon the cream is decidedly beneficial to the taste and quality of the butter produced.

Our churn is simple in construction, and may be easily taken apart for cleaning the same, which is an important feature, for it is highly necessary, in order to produce sweet butter, to have the churn thoroughly cleansed of all matters that would be likely to become sour.

What we claim as new, and desire to secure by Letters Patent, is—

1. The air duct or tube C, arranged within the churn and opening at the bottom thereof, substantially as described.

2. The valve *a*, arranged upon the air-duct C and within the hollow dasher-rod E, substantially as described.

3. The combination of the churn A, air duct or tube C, dasher D, hollow dasher-rod E, and valve *a*, arranged substantially as herein shown and described.

FERDINAND SHURR.
JOHN PALMER.

Witnesses:
HENRY PALMER,
CHAS. C. RATTINGER.